Nov. 19, 1957 B. J. KELLY ET AL Re. 24,394

METHOD OF PRODUCING LINOLEUM

Original Filed Oct. 21, 1950

WALTER E. BENEDICT
JOSEPH F. DOBRY
BERNARD J. KELLY
INVENTOR.

BY Albert Sperry
ATTORNEY

United States Patent Office

Re. 24,394
Reissued Nov. 19, 1957

24,394

METHOD OF PRODUCING LINOLEUM

Bernard J. Kelly, Pennington, N. J., and Walter E. Benedict, Newtown, and Joseph F. Dobry, Langhorne, Pa., assignors, by mesne assignments, to Congoleum-Nairn, Inc., Kearney, N. J., a corporation of New York

Original No. 2,694,831, dated November 23, 1954, Serial No. 451,996, August 25, 1954, which is a division of Serial No. 191,442, October 21, 1950. Application for reissue November 20, 1956, Serial No. 623,515

7 Claims. (Cl. 18—48.8)

Matter enclosed in heavy brackets [ ] appears in the original patent but forms no part of this reissue specification; matter printed in italics indicates the additions made by reissue.

This application is a division of [co-pending] application Serial No. 191,442 filed October 21, 1950, *now abandoned,* and relates to linoleum products and methods of producing the same and is directed particularly to products having a novel type of design in which elements are irregularly disposed and infinitely varied but still generally possess a partial or vaguely defined outline. The blending of such indistinct elements in a manner to impart directional characteristics to the design creates a most unusual and pleasing effect which is in striking contrast with the usual jaspe and streaked designs of directional patterns, and the disorganized and scattered design of marbelized designs.

In the patent to Dobry No. 2,624,068 which issued January 6, 1953, there is described a method of calendering linoleum compositions whereby granules of material undergo but little distortion or elongation by reason of the fact that the rolls of the calender through which the composition is passed are continuously cleaned and to some extent lubricated during the calendering operation. The particles or pieces of linoleum composition therefore are not subjected to the intense drag and elongation ordinarily encountered in a calendering operation.

It has now been discovered that when the composition being calendered is presented to cleaned or lubricated calender rolls in the form of pieces which are substantially thicker than the space between the calender rolls and have a relatively extended area, the resulting calendered sheet presents a most unusual design effect. The pieces of linoleum composition are elongated and greatly distorted but do not lose complete identity. They are instead blended together into a flowing type of pattern which might be said to simulate rippling water or leaping flames, and in some instances the product has a distinct wood graining effect. Such design effects can be produced by suitable selection of shades and colors and when employing pieces of previously sheeted multi-colored linoleum composition which are of proper area and thickness the most pleasing patterns are obtained.

One of the objects of the present invention is to provide linoleum products having novel designs embodied therein.

Another object of the invention is to provide a novel process for producing linoleum products.

A further object is to produce linoleum products embodying design elements which are infinitely variable and directional in character and yet retain at least partial definition of outline.

Another object of the invention is to provide methods of producing linoleum wherein a multitude of substantially flat pieces of linoleum composition of substantial thickness are calendered in a manner to bond them together into a sheet wherein they blend to produce a novel design effect.

These and other objects and features of the present invention will appear from the following description thereof in which reference is made to the figures of the accompanying drawings.

Figure 1:
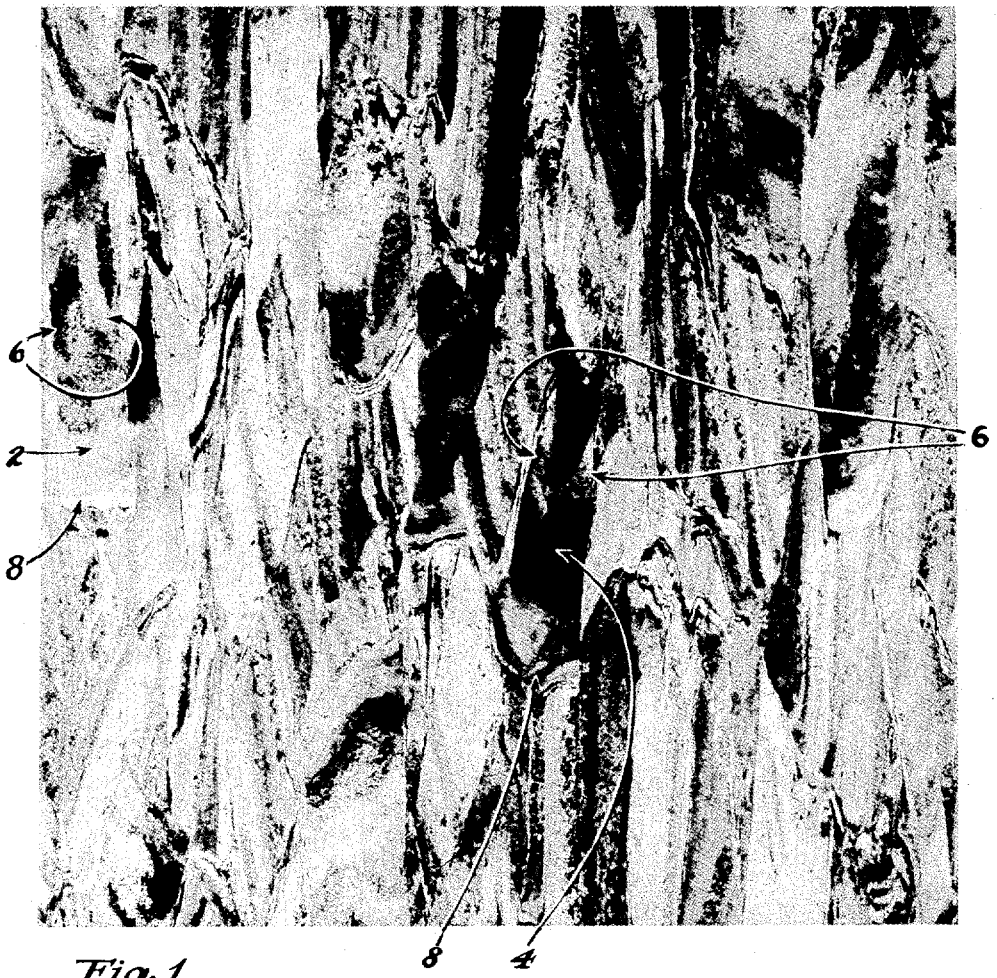
Fig. 1 is a plan view of a typical product embodying the present invention.

The product shown in Fig. 1 may be produced by calendering together squares or *rectangular* pieces of uncured linoleum composition which are substantially greater in thickness than the space between the calender rolls and of sufficient area to give definition or at least partial identity to individual elements in the finished product. These elements serve to give the design as a whole what may be termed longitudinal and transverse directions. However, the directional effect is relieved and the whole design may be said to be opened up so as to destroy the streaked appearance which the product might otherwise possess. Thus the pattern includes as a predominant feature a number of elements such as those indicated at 2 and 4, which have generally parallel sides of rather definite outline as shown at 6. One end portion 8 of such design elements is usually disposed at an angle to the side 6 while the opposite end of the element is quite indistinct or non-existent and is blended or submerged into other elements of the design. Thus no single element will ordinarily possess a complete outline or such identity so as to stand out in the pattern. Nevertheless the individuality of elements is not completely lost and they appear as distinct zones of extended area.

In producing products having such new designs the spacing or width of the predominant elements or zones in the design and the open appearance of the pattern is influenced by the width or size of the pieces of linoleum composition fed to the calender. If these pieces are less than about one-half inch in their greatest dimension much of the bold, open character of the design and the evidence of individual elements is lost. On the other hand, if the pieces are much more than about one and one-half inch across, the design becomes somewhat scattered and more haphazard in appearance. However, when using pieces which are from about one-half to one and one-half inches in their greatest dimension and preferably about three-quarters inch across, the fluid and distinctive character of the design represented by Fig. 1 is obtained. *Thus the pieces should preferably have a ratio of length to width of from 1 to 2.*

It is also desirable to use pieces of linoleum composition which are relatively flat or thin and yet they should be about one and one-half to four and preferably about twice to three times as thick as the spacing of the calender rolls in order to assure the desired spreading and flow necessary to provide an attractive design and effective bonding of the pieces into a unitary sheet.

It is, therefore, necessary, in accordance with the process of the present invention, to arrange *in a loose overlapping relationship* relatively flat or thin multicolored *rectangular* pieces of uncured linoleum composition having a greatest dimension ranging from at least about one-half inch to no more than about one and one-half inches and having a thickness ranging from at least about one and one-half to no more than about four times the distance between the calender rolls to be employed, [in a loose overlapping relationship] and thereafter to feed such pieces into the nip of calender rolls as described more fully hereinafter. It is most preferred that the pieces be in the form of squares measuring about one inch on each side and have a thickness of from about two to three times the distance between the calender rolls.

Figure 2:
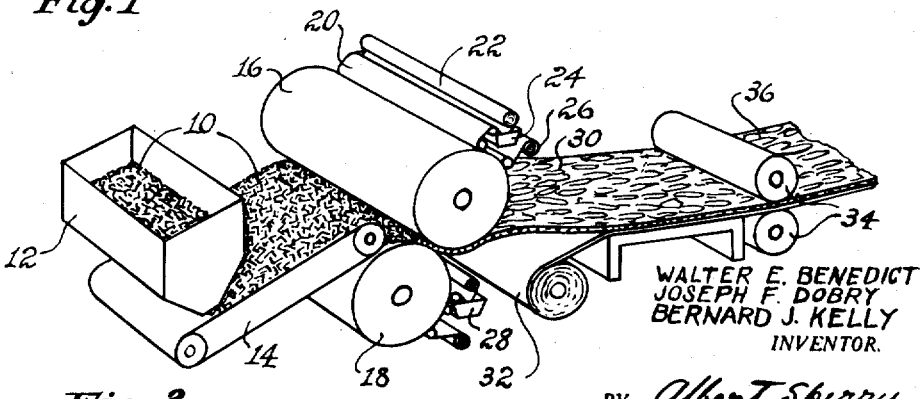
Fig. 2 is a diagrammatic illustration of typical equipment used in producing the product of Fig. 1.

As shown diagrammatically in Fig. 2 the chips, *rectangular* pieces or squares 10 of uncured linoleum composition are fed from a hopper 12 to a conveyor 14 which feeds them to the nip of the calender rolls 16 and 18. The rolls are continuously cleaned by suitable means such as that shown and described in the co-pending application of Benedict and Dobry, Serial No. 175,410, filed July 22, 1950. In such construction a web of paper 20 passes from the supply roll 22 through a bath of solvent in the liquid container 24 and travels over the surface of the calender roll 16 in a direction opposite to the roll and is wound upon the take-up roll 26. The same or equivalent type of cleaning device 28 serves to clean the surfaces of the calender roll 18 so that both rolls continuously present clean, somewhat lubricated faces to the pieces of linoleum being calendered. The composition therefore is not pulled out or elongated sufficiently to destroy the identity of the pieces altogether although they are necessarily distorted and elongated in being reduced in thickness and bonded together with other pieces to form a unitary sheet.

The rolls are preferably maintained at different temperatures and rotated at somewhat different speeds. Thus roll 16 may be cooled while roll 18 is heated and roll 16 may rotate slightly faster than roll 18.

The calendered sheet leaving the calender rolls 16 and 18 is indicated at 30 and may be cut or handled in any desired manner to produce a finished floor covering. As shown the sheet 30 is applied to a layer of backing material 32, such as asphalt saturated felt, and the assembled sheet and backing are bonded together by passage through the roll press 34 to form the finished product 36.

The sheet 30 may instead be cut into blocks for assembly in a tile-like design or the sheet may be cut into elements for assembly in forming conventional inlaid patterns. In any case the unusual patterned design gives a very characteristic effect by reason of its open, bold and yet infinitely varying directional design elements.

[While the pieces of linoleum composition are most conveniently formed as squares, they may be in the shape of discs or irregular pieces of varying outline. They] *The pieces of linoleum composition* preferably are of various different colors and the most attractive effects are attained by employing multi-colored pieces produced by calendering granules of differently colored linoleum composition so as to form a jaspe or marble type design. Such multi-colored sheets are cut [or broken] into pieces about one inch square, and when fed to a calender in a relatively thick layer and irregular arrangement in overlapping relation a product of the type illustrated in Fig. 1 is produced.

The rate at which the pieces are fed to the calender and the temperature and speed of rotation of the calender rolls, of course, may be varied. It should therefore be understood that the apparatus employed and the method of operation herein described are intended to be illustrative only and are not intended to limit the scope of the invention.

We claim:

1. *A* [The] method of producing linoleum products in a continuous operation which comprises the steps of arranging flat *rectangular* pieces of uncured linoleum composition in a loose overlapping relation, continuously feeding said pieces while so arranged *to the nip between* [into engagement with the surface of a] *two* calender *rolls* while applying a cleaning agent to and removing the same from the calender [roll] *rolls* for continuously cleaning the surfaces of *said* [the calender] rolls presented to *said pieces* [the linoleum composition], said pieces [of linoleum composition] being from at least about one and one-half to no greater than about four times as thick as the space between *said* [the calender] rolls and measuring from not less than about one-half inch to no greater than about one and one-half inches at the greatest dimension *and having a ratio of length to width of from 1 to 2.*

2. *A* [The] method of producing linoleum products in a continuous operation which comprises the steps of arranging [substantially square] flat *squares* [pieces] of uncured linoleum composition in a loose overlapping relation, continuously feeding said [pieces] *squares* while so arranged *to the nip between two* [into engagement with the surface of a] calender *rolls* while applying a cleaning agent to and removing the same from the calender *rolls* [roll] for continuously cleaning the surfaces of [the calender] *said* rolls presented to *said squares* [the linoleum composition], said [pieces of linoleum composition] *squares* being from at least about two to no greater than about three times as thick as the space between the calender rolls and measuring about one inch on each side.

3. *A* [The] method of producing linoleum products in a continuous operation which comprises the steps of calendering granules of differently colored uncured linoleum composition so as to produce a sheet having a multi-colored, streaked design, cutting said sheet into *rectangular* pieces measuring from at least about one-half inch to no greater than about one and one-half inches at the greatest dimension *and having a ratio of length to width of from 1 to 2,* arranging said pieces in a loose overlapping relation, continuously feeding said pieces while so arranged to calender rolls which are spaced apart from at least about *one-fourth* [one and one-half] to no greater than about *two-thirds* [four times] the thickness of [the] *said* pieces [of linoleum composition], and continuously applying a solvent for linoleum composition to the calender rolls and thereafter wiping the rolls to remove the solvent and any adhering film of composition therefrom so that the surfaces of the calender rolls presented to said pieces [of linoleum composition] are continuously cleaned.

4. *A* [The] method of continuously producing a linoleum product which comprises the steps of forming a multi-colored sheet of uncured linoleum composition, [breaking up] *cutting* said sheet into a multitude of flat *rectangular* pieces measuring at least about one-half inch and not greater than about one and one-half inches at the greatest dimension *and having a ratio of length to width of from 1 to 2,* arranging said pieces in a loose overlapping relation, continuously feeding said pieces while so arranged *to the nip between two* [into engagement with the surfaces of a] calender *rolls,* said pieces being of a thickness of at least about one and one-half to no greater than about four times the distance between the calender rolls, continuously maintaining the calendering surfaces *of said rolls* as they approach the loosely arranged pieces in a clean, film-free condition, and elongating said pieces between the calendering surfaces in a common direction and simultaneously bonding them together into a unitary sheet while preserving the identity in outline of at least a portion of said pieces in the resulting calendered sheet.

*5. A method of producing linoleum products in a continuous operation which comprises the steps of arranging flat square pieces of uncured linoleum composition in a loose overlapping relation, continuously feeding said pieces while so arranged to the nip between two calender rolls while applying a cleaning agent to and removing the same from the calender rolls for continuously cleaning the surfaces of said rolls presented to said pieces, said pieces being from at least about one and one-half to no greater than about four times as thick as the space between said rolls and measuring from about one-half inch to about one and one-half inches on a side.*

*6. In a method of producing calendered linoleum products in a continuous operation wherein pieces of uncured linoleum composition are fed to the nip between two calender rolls having clean surfaces and bonded into a smooth unitary sheet therebetween, the improvement which comprises feeding to said nip in a loose overlapping relation flat rectangular pieces of uncured linoleum com-*

*position measuring from not less than about one-half inch to no greater than about one and one-half inches at the greatest dimension and having a ratio of length to width of from 1 to 2, said pieces being from at least about one and one-half to no greater than about four times as thick as the space between the calender rolls.*

*7. In a method of producing calendered linoleum products in a continuous operation wherein pieces of uncured linoleum composition are fed to the nip between two calender rolls having lubricated surfaces and bonded into a smooth unitary sheet therebetween, the improvement which comprises feeding to said nip in a loose overlapping relation flat rectangular pieces of uncured linoleum*

*composition, measuring from not less than about one-half inch to no greater than about one and one-half inches on a side and being from at least about one and one-half to no greater than about four times as thick as the space between the calender rolls.*

References Cited in the file of this patent or the original patent

UNITED STATES PATENTS

| | | |
|---|---|---|
| 1,975,515 | Mayer | Oct. 2, 1934 |
| 2,624,068 | Dobry | Jan. 6, 1953 |